(12) United States Patent
Mahapatra et al.

(10) Patent No.: US 9,935,830 B1
(45) Date of Patent: Apr. 3, 2018

(54) CLOUD MANAGEMENT SYSTEM AND METHOD FOR DISPARATE COMPUTING NODES IN A CLOUD COMPUTING ENVIRONMENT

(71) Applicant: VCE Company, LLC, Richardson, TX (US)

(72) Inventors: Akshaya Mahapatra, San Jose, CA (US); Michael Tan, Palo Alto, CA (US); Peng Liu, Milpitas, CA (US); Gilbert Lau, Cupertino, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 298 days.

(21) Appl. No.: 14/719,577

(22) Filed: May 22, 2015

(51) Int. Cl.
*G06F 15/177* (2006.01)
*H04L 12/24* (2006.01)

(52) U.S. Cl.
CPC .......... *H04L 41/0816* (2013.01); *H04L 41/50* (2013.01)

(58) Field of Classification Search
CPC .......... G06F 8/20; G06F 9/541; G06F 9/4843; G06F 9/45558; G06F 9/5072; H04L 12/66; H04L 63/10; H04L 67/00; H04L 41/50

See application file for complete search history.

(56) References Cited

U.S. PATENT DOCUMENTS

| | | | |
|---|---|---|---|
| 9,306,949 B1 * | 4/2016 | Richard | H04L 63/10 |
| 9,357,034 B2 * | 5/2016 | Kumar | |
| 2002/0169852 A1 * | 11/2002 | Schaeck | G06Q 20/108 709/218 |
| 2003/0055868 A1 * | 3/2003 | Fletcher | G06F 8/20 709/201 |
| 2006/0041641 A1 * | 2/2006 | Breiter | G06F 9/5072 709/219 |
| 2011/0231899 A1 * | 9/2011 | Pulier | G06F 9/45558 726/1 |
| 2012/0203908 A1 * | 8/2012 | Beaty | G06F 9/541 709/226 |
| 2012/0311157 A1 * | 12/2012 | Erickson | G06F 9/541 709/226 |
| 2013/0080509 A1 * | 3/2013 | Wang | H04L 12/66 709/203 |
| 2015/0295844 A1 * | 10/2015 | Perreira | G06F 9/4843 709/226 |

\* cited by examiner

*Primary Examiner* — Dustin Nguyen
(74) *Attorney, Agent, or Firm* — Polsinelli PC

(57) ABSTRACT

A cloud management system includes a computer executed application that generates an interface for management of the resources of a computing node by a cloud portal. The application receives an interface definition associated with the resource in which the interface definition includes information associated with one or more configuration operations to be performed on the resource. Using the interface definition, the application generates a cloud portal interface component that communicates with a cloud portal to translate the one or more configuration operations to a specified protocol, and generates a resource endpoint component that receives the configuration operations from the cloud portal interface component, translates the configuration operations to a format suitable for use by the resource, and transmits the configuration operations to the resource for configuring the resource.

20 Claims, 7 Drawing Sheets

CLOUD MANAGEMENT SYSTEM AND METHOD FOR DISPARATE COMPUTING NODES IN A CLOUD COMPUTING ENVIRONMENT

TECHNICAL FIELD

Aspects of the present disclosure relate to computing devices and, in particular, to a cloud management system and method for disparate computing nodes that are configured in a cloud computing environment.

BACKGROUND

Traditionally, computing services have been provided by computing devices that functioned according to a silo-based approach in which the computing devices have been limited to performing certain dedicated tasks. Nevertheless, with the advent of advanced computer networking and virtualization technologies, many computing services are now provided by cloud computing environments that can be more efficient than their traditional computing device counterparts. In general, cloud computing environments typically employ multiple computing devices that are more efficient mainly due to their ability to share workload with one another and may allocate/de-allocate resources on demand such that resource sharing and economies of scale may be achieved.

SUMMARY

According to one aspect of the present disclosure, a cloud management system includes a computer executed application that generates an interface for management of the resources of a computing node by a cloud portal. The application receives an interface definition associated with the resource in which the interface definition includes information associated with one or more configuration operations to be performed on the resource. Using the interface definition, the application generates a cloud portal interface component that communicates with a cloud portal to translate the one or more configuration operations to a specified protocol, and generates a resource endpoint component that receives the configuration operations from the cloud portal interface component, translates the configuration operations to a format suitable for use by the resource, and transmits the configuration operations to the resource for configuring the resource.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Figure 1A:
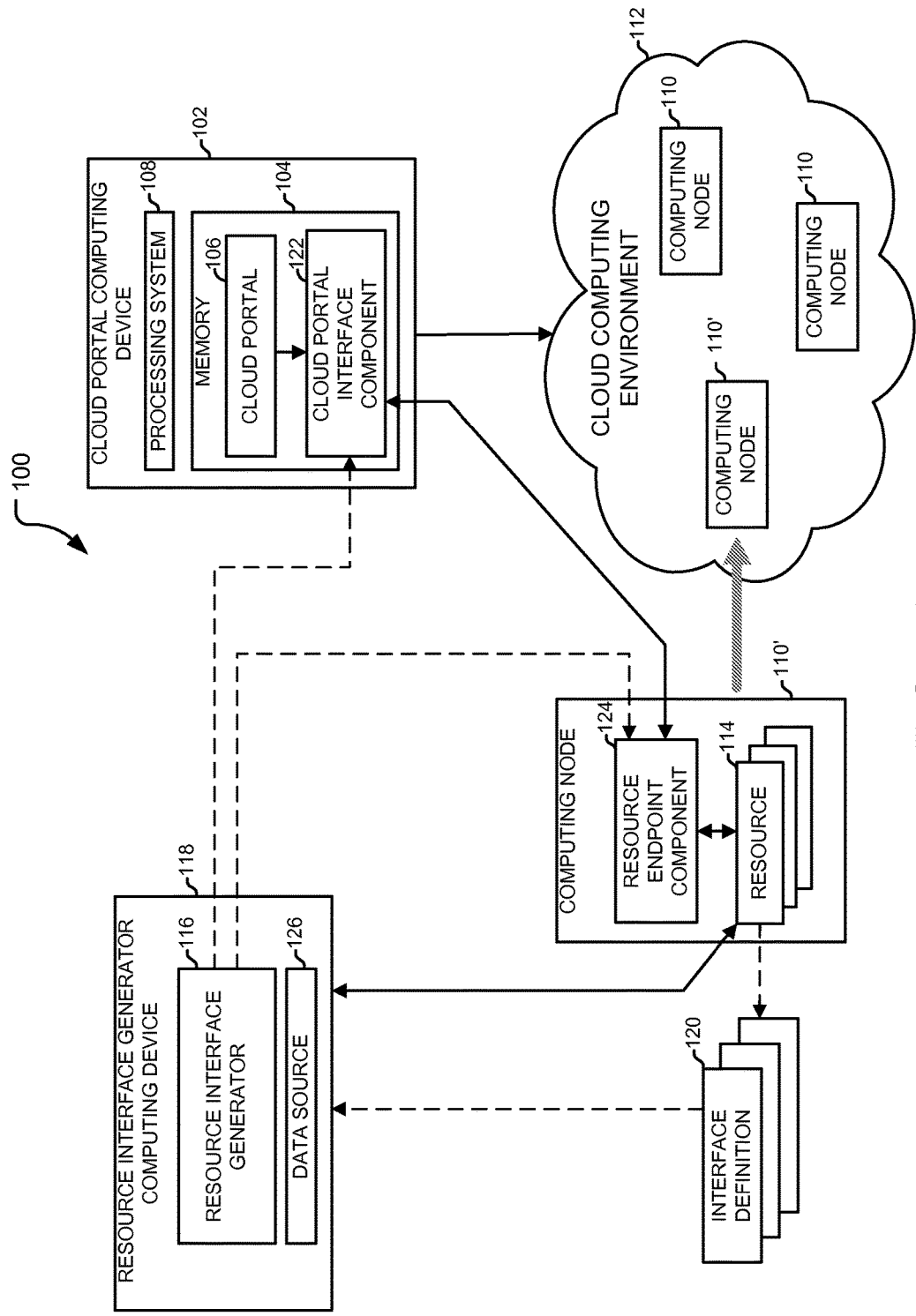
FIG. 1A illustrates an example cloud portal management system according to one embodiment of the present disclosure.

Embodiments of the present disclosure provide a system for management of the resources of a computing node by a cloud management system, such as a cloud portal, that may not natively support the computing node. Whereas a typical cloud computing environment often includes many individual computing nodes that often differ in their capabilities, structure, operation, and/or purpose, the management of certain computing nodes from one cloud portal that could otherwise leverage the efficient sharing and distribution of resources inherent with cloud computing environments, has been difficult to achieve. This has been due at least in part, to the disparate nature of many computing nodes that may, or may not, be supported by these cloud portals. Embodiments of the present disclosure provide a solution to this problem, among other problems, using a system that generates an interface between the cloud portal and the resources of the computing node using an interface definition associated with each resource in the computing node. In other words, embodiments of the present disclosure may provide a standardized interface for communication between conventional cloud portals and the resources of certain computing nodes whose natively provided interface is different from those of conventional cloud portals.

The term "cloud portal" is often used to refer to a cloud management system that manages the operation of multiple computing nodes of a cloud computing environment. Cloud portals are computer executable applications that manage the operation of multiple resources in a cloud computing environment. These cloud portals also provide a common interface for deploying applications to the nodes or the specific resources of the nodes. Examples of such cloud portals may include a vCloud Automation Center (vCAC) software suite available from VMware Corporation, in Palo Alto, Calif., a VCE Cloud Management Portal software suite available from VCE LLC, in Richardson, Tex., and a Cisco Intelligent Automation For Cloud (CIAC) software suite available from Cisco Corporation in San Jose, Calif. These conventional cloud portals provide a platform for coordinating or orchestrating the operation of multiple resources configured in a cloud computing environment that may, in many cases, span several different geographical locations and use multiple computing nodes, such as computer clusters, computing grids, converged infrastructures, and the like.

Nevertheless, conventional cloud portals typically do not provide a standardized interface for all available computing nodes that may be configured in a cloud computing environment. For example, certain cloud portals may be configured to manage only certain brands and/or types of computing nodes. To circumvent this problem, certain computing nodes not supported by a conventional cloud portal often require significant customization for their deployment. For example, if a non-supported computing node with multiple resources is deployed in a cloud computing environment, information for each resource must be manually obtained and translated to a format that is usable by the cloud portal so that it may be managed, a process that is tedious and time consuming. Furthermore, this process is often required to be performed each time a new non-supported computing node is deployed, thus incurring an undue duplication of effort on the part of information technology (IT) specialists who manage the cloud computing environment.

FIG. 1A illustrates an example cloud portal management system 100 according to the teachings of the present disclosure. The system 100 includes a cloud portal computing device 102 having a memory 104 for storing a cloud portal 106 that is executed by a processing system 108. The cloud portal 106 communicates with one or more computing nodes 110, which may be configured in a cloud computing environment 112, to monitor and control their operation. In this example, a new computing node 110' is to be deployed in the cloud computing environment 112 and is not natively supported by the cloud portal 106. As such, a resource interface generator 116 is stored in and executed by a resource interface generator computing device 118 to receive an interface definition 120 for each resource 114 of the computing node 110', and according to the interface definition 120, generate a cloud portal interface component 122 and a resource endpoint component 124 that are used for managing the operation of the resource 114 from the cloud portal 106.

The computing nodes 110 arranged as shown herein are configured in a cloud computing environment 112; nevertheless, it should be understood that the system 100 may be used to manage a single computing node 110 or any other computing system by the cloud portal 106. Accordingly, the term "cloud portal" is not meant to restrict the portal or the configuration system for use only in cloud environments. Whereas certain computing systems generally include localized, stand-alone structures, a cloud computing environment usually includes networked components which may be in one or more remotely configured computing systems that function in a collaborative manner to provide services over a diverse geographic region. Although the illustrated cloud computing environment 112 only shows computing nodes 110, it should be understood that the cloud computing environment 112 may include other components, such as gateways for secure management of data and access to the portal, communication nodes for communication among the multiple computing nodes 110, and/or other devices that support the overall operation of the cloud computing environment 112.

The computing node 110' may be any type, such as a computer cluster, computing grid, blade array, and/or a converged infrastructure (CI), which may also be referred to as a unified computing system, a fabric-based computing system, and a dynamic infrastructure. Converged infrastructure (CI) type computing nodes 110 may be well suited for use with the cloud portal management system 100 for several reasons. For one reason, CIs typically include a complex mix of multiple sub-systems, such as processors, storage, network switches, and virtual layers, each having multiple resources with individual characteristics that should be, but are often not supported by conventional cloud portals. Additionally, multiple CIs are often bundled with the same or similar type sub-systems, thus forming a modular, extensible platform, which can be used by the cloud portal management system 100 for managing multiple CIs without undue duplication of effort. An example CI that may be managed by the cloud portal management system 100 will be described in detail herein below.

The resources 114 of the computing node 110 may include any type, such as hardware resources or virtual objects. The hardware resources 114 of the computing node 110 may include any type of hardware that provides physical resources for the computing node 110 while the virtual objects may include any logical entity that provide virtualization. For example, the virtual objects may be virtual machines, virtual switches, and virtual storage units. Virtual objects may also include logical configuration constructs, such as storage partitions, port groups, virtual private clouds, virtual local area networks (LANs), and private virtual data centers (PVDCs).

In general, the resource interface generator 116 generates the cloud portal interface component 122 and resource endpoint component 124 to be used for interfacing the cloud portal 106 with each resource 114 of the computing node 110', which may be particularly beneficial in cases where the computing node 110' is not natively supported by the cloud portal 106. To accomplish this, the resource interface generator 116 receives an interface description 120 associated with each resource 114 of the computing node 110' to generate the cloud portal interface component 122 and resource endpoint component 124 and installed on the cloud portal 106 and computing node 110', respectively. For example, the cloud portal interface component 122 may be installed as a plug-in on the cloud portal 106, and the resource endpoint component 124 is installed on a dedicated resource of the computing node 110'. The resource endpoint component 124 translates messages to/from the cloud portal interface component 122 to a form suitable for use by its respective resource 114. For example, the cloud portal interface component 122 and resource endpoint component 124 may provide characteristic information about the resource 114 to the cloud portal 106, and provide means to manage or modify the resource 114 according to its capabilities. Embodiments of such a system may be beneficial given that the resources 114 may possess differing characteristics that often require varying means of control to optimize their operation.

For example, a typical computing node, such as a CI, may include various physical resources, such as computing blades, storage objects (e.g., logical unit numbers (LUNs)), and network switches, storage ports, and/or virtual objects, such as virtual machines, virtual hosts (e.g., blades as seen by a virtual layer of a CI), datastores (e.g., virtual local area network (VLAN)/virtual storage area network (VSAN), and LUNs as seen by a virtual layer of the CI). Each of these resources may have individual characteristics that requires individual management, such as a create operation (e.g., create a VM, provision a host, create a LUN and/or datastore), an edit operation (e.g., modify an IP address of a VM, Change a host name, etc.), a remove operation (e.g., delete a VLAN, delete a datastore, etc.), and/or and associate operation (e.g., associate a VLAN with a cluster). Each of these operations may involve unique input parameters. Thus, the resource interface generator 116 uses the interface definition 120 to generate the cloud portal interface component 122 and resource endpoint component 124 in a manner that allows each resource 114 to be individually managed according to its unique characteristics and capabilities.

Each interface definition 120 includes information about its respective resource 114 and may be generated by the resource interface generator 116 or it may be manually generated. If generated by the resource interface generator 116, the resource interface generator 116 may issue one or more requests for information about the resource 114 and generate the interface definition 120 using the obtained information. The interface definition 120 may include any desired format that may be used by the resource interface generator 116 to generate the cloud portal interface component 122 and the resource endpoint component 124. Examples of suitable formats include, but not limited to, an extensible markup language (XML) format, a Javascript object notation (JSON) format, and a YAML Ain't Markup Language (YAML) format. An example interface definition 120 that is formatted according to the YAML protocol is shown herein below:

```
name: CloudManager
version: 1.0
resource:
   vlan:
      operation: create
         url: /vblock/vlan
         method: post
         input: [name,id]
         output: [status]
         category: network
      operation: remove
         url: /vblock/vlan/id
         method: delete
         input: [id]
         output: [status]
         category: network
```

The particular example interface definition 120 shown is associated with a VLAN resource 114 that may be managed by a cloud portal 106 named 'CloudManager', with a software version '1.0' using a representational state transfer (REST) interface. The VLAN resource 114 includes two operations: a 'create' operation and a 'remove' operation. The interface to the 'create' operation has an address (e.g., URL) named '/vblock/vlan' and includes an input field for receiving instructions from the cloud portal 106 by the VLAN, an output field for transmitting status information associated with the 'create' operation from the VLAN back to the cloud portal 106. The interface definition 120 may also include other generic information, such as a category field named 'network' indicating the sub-system that the VLAN is a part of. Conversely, the interface to the 'remove' operation has an address (e.g., URL) named '/vblock/vlan/id' and includes an input field for receiving instructions from the cloud portal 106 by the VLAN, an output field for transmitting status information associated with the 'remove' operation from the VLAN back to the cloud portal 106. The interface definition 120 may also include other generic information, such as a category field named 'network' indicating the sub-system that the VLAN is a part of. Although only one example interface definition 120 is shown and described herein, it should be understood that other embodiments of interface definitions 120 may be associated with other types of resources and be formatted according to a protocol other than the YAML protocol.

The cloud portal interface component 122 and/or the resource endpoint component 124 may include any functionality that enables communication between the cloud portal 106 and the resources 114 of the computing node 110', provides information about each resource 114 to the cloud portal 106, and/or facilitates management of each resource 114 using the information. In one embodiment, the cloud portal interface component 122 and resource endpoint component 124 are structured according to a REST architecture style in which the interface to each resource is provided as a web service. Other embodiments may include other structures and/or protocols, such as a JavaScript Object Notation (JSON) that uses human-readable text to communicate over a communication link, such as the Internet.

The system 100 includes a data source 126 that stores interface definitions 120 obtained for each resource 114 in the computing node 110', a cloud portal interface component/rec repository 128 for storing cloud portion interface components 122 and resource endpoint components 124 for each resource 114. The data source 126 may also store other information, such as a manifest records 130 and resource type records 132 that may be useful for generating the interface definitions 120, such as via a discovery process. The manifest records 130 store information about the resources 114 of the computing node 110', and the resource type records 132 store information about characteristics of particular types or classes of resources that may be used to automatically construct the interface definitions 120 for each resource 114. For example, the resource interface generator 116 may perform a discovery process to learn about the existence of the resources 114 in the computing node 110, and store this information in the manifest records 130. Then for each manifest record 130, the resource interface generator 116 may issue a request to each resource 114 to determine its type, and construct an interface definition 120 by accessing the resource type records 132.

The information provided to the resource interface generator 116 may be the interface definition 120, or the information may include raw information that is used by the resource interface generator 116 to generate the interface definition 120. That is, the resource interface generator 116 may receive the interface definition 120 from each resource 114, or the resource interface generator 116 may generate the interface definition 120 using discrete information fields provided by the resource 114. In one embodiment, the resource type records 132 may be included to provide additional information to the resource interface generator 116 for generating the interface definition 120. For example, in response to a request for information from the resource interface generator 116, a resource 114 may respond with only its resource type. In such a case, the resource interface generator 116 may access a resource type record 132 associated with the resource type information provided by the resource 114 to generate the interface definition 120.

The cloud portal computing device 102 includes a processing system 108 that executes the cloud portal 108 which is stored in volatile or non-volatile memory 104 as executable instructions. The cloud portal computing device 102 may include any type of computing system, such as one or more management computing systems, personal computers, mobile computers, servers, and/or other mobile devices, and other hosts. The cloud portal computing device 102 may communicate with the resource interface generator computing device 118 and computing node 110' via wireless and/or wired communications.

The cloud portal computing device 102, resource interface generator computing device 118, and computing node 110' communicate with one another in any suitable manner, such as using wireless, wired, and/or optical communications. In one embodiment, communication may occur over the Internet, an intranet, or another wired and/or wireless communication network. In another embodiment, the cloud portal computing device 102, resource interface generator computing device 118, and computing node 110' communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the cloud portal computing device 102, resource interface generator computing device 118, and computing node 110' may communicate with one another without the use of a separate and a distinct network. Additionally, other embodiments contemplate that the modules employed by the resource interface generator 116 are executed by a computing device (e.g., resource) configured on the computing node 110'.

Figure 2A:
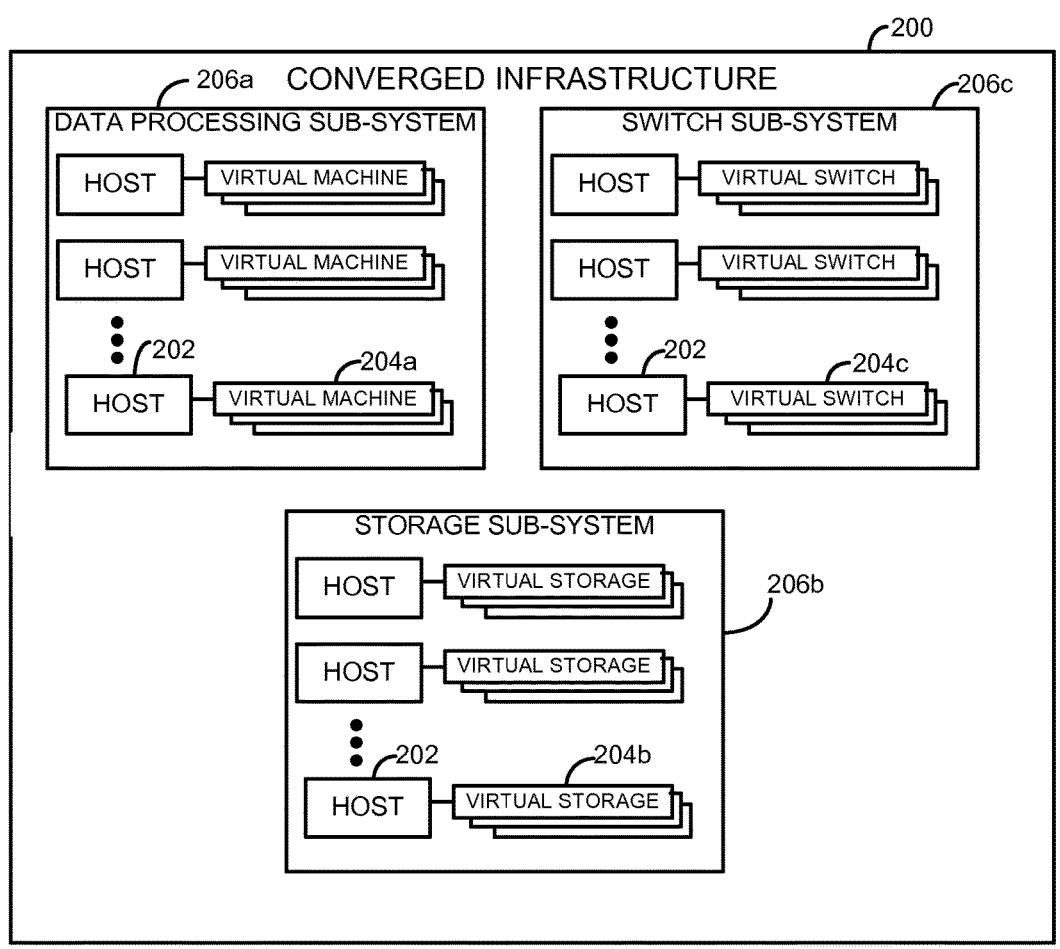
FIG. 2A illustrates an example converged infrastructure that may be managed by the cloud management system according to one embodiment of the present disclosure.

FIG. 2A illustrates an example converged infrastructure 200 according to the teachings of the present disclosure. The converged infrastructure 200 may include multiple hosts 202 that each executes one or more virtual objects (e.g., virtual machines 204a, virtual storage objects 204b, and virtual switch objects 204c). The hosts of a converged infrastructure are often referred to as compute servers. Nevertheless in this disclosure, the term host may be interpreted as any physical device and/or component of the converged infrastructure that support the operation of virtual resources and services provided by those virtual resources. The particular converged infrastructure 200 as shown includes several sub-systems, such as a data processing sub-system 206a, a data storage sub-system 206b, and a switch sub-system 206c. The hosts 202 of each sub-system 206 generally refer to the hardware resources of the computing infrastructure, while the virtual objects 204 of each sub-system 206 generally refer to virtual resources of the computing infrastructure. Virtual resources may also include one or more logical configuration constructs that are managed by the cloud portal 106. For example, one type of logical configuration construct includes a partition in which certain resources are allocated in the virtual computing environment. Nevertheless, it should be understood that other converged infrastructures may include additional, fewer, or different types of sub-systems without departing from the spirit and scope of the present disclosure.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that other computing environments and converged infrastructure, such as a computer cluster, computing grid, blade array, and/or other converged infrastructure may be managed using the teachings of the present disclosure. For example, a converged infrastructure 200 such as that shown includes components found in Vblock™ System infrastructure packages available from VCE, LLC, which is headquartered in Richardson, Tex.

In one aspect, the data storage sub-system 206b includes computer-readable memory structures for storing data used by the converged infrastructure 200, which may include network attached storage (NAS) arrays and/or storage area network (SAN) arrays that are associated with virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) 202 that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware Corporation, which is headquartered in Palo Alto, Calif.

Figure 2B:
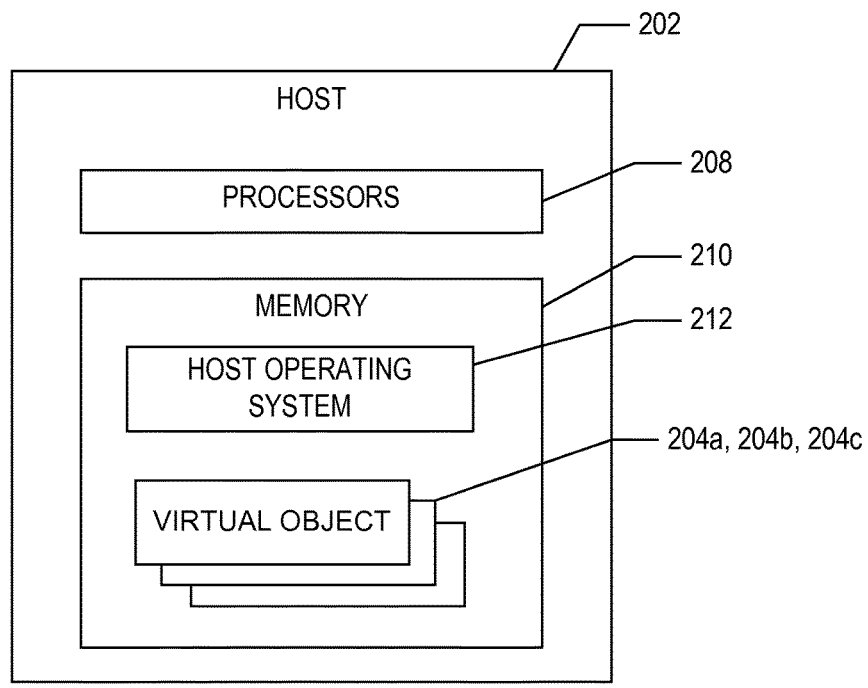
FIG. 2B illustrates an example host of the converged infrastructure according to one embodiment of the present disclosure.
Figure 1B:
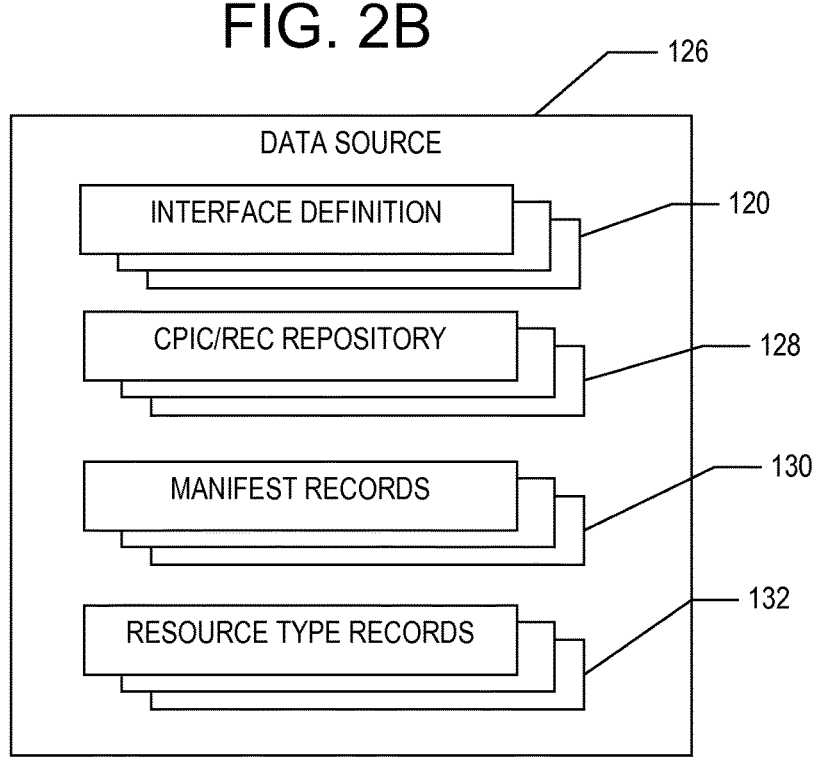
FIG. 1B illustrates an example data source that may be used by the cloud portal management system according to one embodiment of the present disclosure.

FIG. 2B depicts an example host 202 implemented on each converged infrastructure 200 according to one aspect of the cloud portal management system 100. The host 202 is a computing or processing device that includes one or more processors 208 and a memory 210. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 210 stores a host operating system 212 and one or more virtual objects (e.g., VMs 204a, virtual storage objects 204b, and virtual switch objects 204c) that are executed by the processor 208. The host operating system 212 controls and manages the operation of the virtual objects executed on the host 202. For example, control signaling for starting, stopping, and/or changing operating parameters of each virtual object is managed through the host operating system 212.

Figure 3:
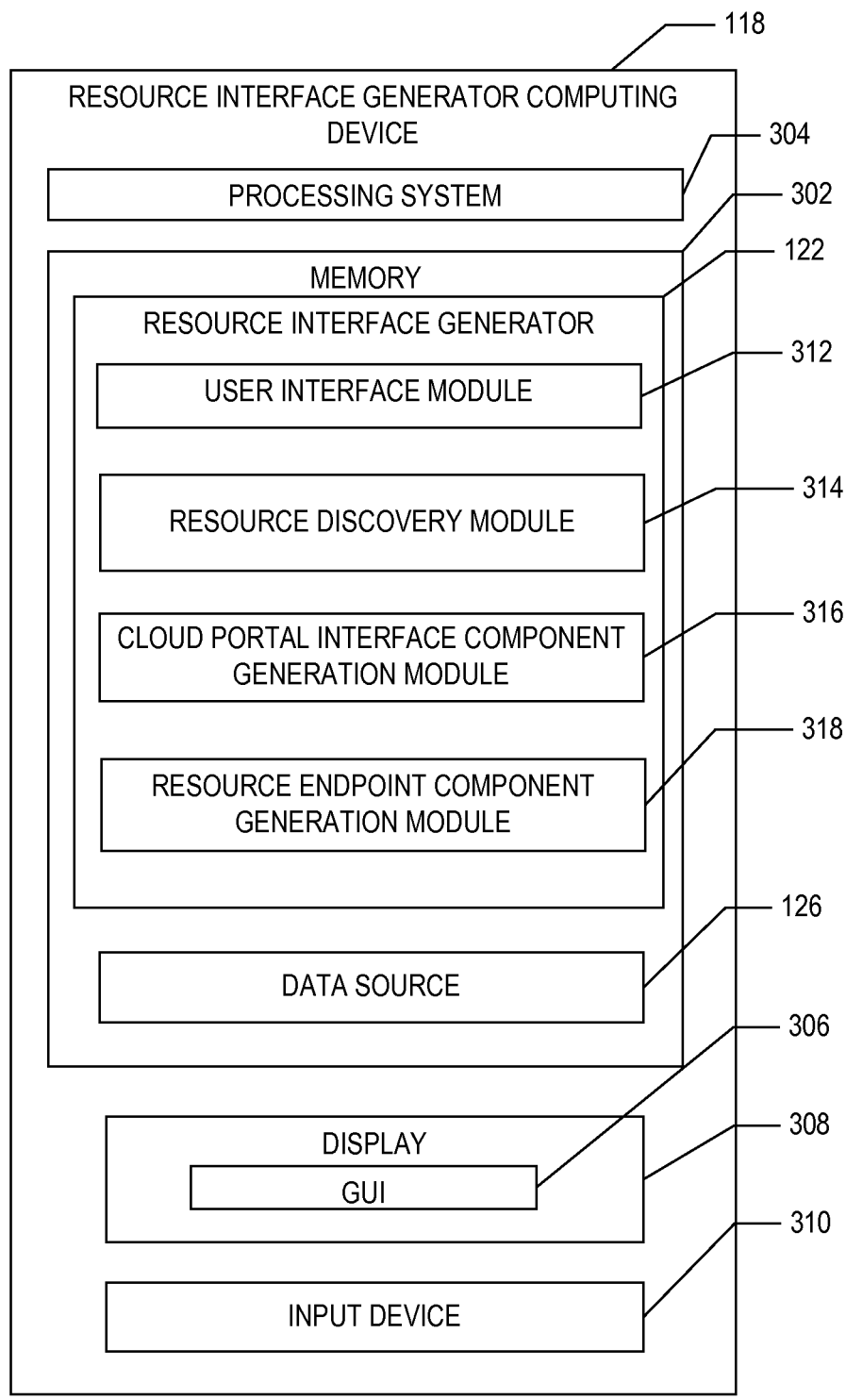
FIG. 3 illustrates a block diagram of an example resource interface generator executed on the resource generator computing system according to one embodiment of the present disclosure.

Referring now in more detail to FIG. 3, a block diagram of an example resource interface generator 116 executed on the resource interface generator computing device 118 is depicted according to one aspect of the present disclosure. The resource interface generator 116 is stored in a memory 302 (i.e., computer readable media) and is executed on a processing system 304 of the resource interface generator computing device 118. According to one aspect, the resource interface generator computing device 118 also includes a graphical user interface (GUI) 306 displayed on the display 308, such as a computer monitor, for displaying data. The resource interface generator computing device 118 may also include an input device 310, such as a keyboard or a pointing device (e.g., a mouse, trackball, pen, or touch screen) to enter data into or interact with the GUI 306. According to one aspect, the resource interface generator 116 includes instructions or modules that are executable by the processing system 302 as will be described in detail herein below.

The memory 302 includes volatile media, nonvolatile media, removable media, non-removable media, and/or another available medium. By way of example and not limitation, non-transitory memory 302 comprises computer storage media, such as non-transient storage memory, volatile media, nonvolatile media, removable media, and/or non-removable media implemented in a method or technology for storage of information, such as computer readable instructions, data structures, program modules, or other data.

A user interface module 312 facilitates the receipt of input data and/or output data from or to a user, respectively. In one example, the user interface module 306, using the GUI 306, generates a drop down menu for receiving selection of one cloud portal 106 (e.g., VCE Cloud Management Portal, vCAC, or the CIAC cloud portal) to be used for interfacing the resources 114 of the computing node 110' with the selected cloud portal. As another example, the user interface module 312 may, using the GUI 306, receive various elements of user input, such as an IP address of the computing node 110', a name of the computing node 110', or other suitable information associated with the computing node 110' to be interfaced with the cloud portal. For yet another example, the user interface module 306 may, using the GUI 306, receive user input for initiating a discovery operation for discovering the resources 114 of the computing node 110'.

A resource discovery module 314 performs a discovery process to obtain information associated with each resource 114 in the computing node 110' and store the obtained resource information in the computing node manifest records 130. For example, the resource discovery module 314 may communicate with one or more element managers 406 (See FIG. 4) configured on the computing node 110' to obtain the resource information. For another example, the resource discovery module 314 may communicate directly with each resource 114, such as by issuing broadcast messages requesting that each resource 114 respond with identifying information indicating their presence and/or type.

In one embodiment, the resource discovery module 314 may perform the discovery process on an ongoing, periodic basis so that the manifest records 132 may be maintained in an up-to-date condition. For example, the resource discovery module 314 may poll the element managers 406 to determine whether any resources 114 have been added, deleted, and/or modified, and if so, perform a discovery process with those resources 114 and update their information in the computing node manifest records 132. As another example, the element managers 406 may be configured to automatically notify the resource discovery module 314 whenever a resource 114 is added, deleted, and/or modified such that the resource discovery module 314 is triggered to perform a discovery process on those resources 114.

A cloud portal interface component generation module 316 generates a cloud portal interface component 122 to be used for interfacing the cloud portal 106 with the resource endpoint component 124. For example, the cloud portal interface component generation module 316 may include one or more protocol translation mechanisms in the cloud portal interface component 122 to convert input messages into a form readable by the cloud portal 106 and convert output instructions into a form readable by the resource endpoint component 124. In one embodiment, the cloud portal interface component 122 may function as a modular software component (e.g., plug-ins, add-ons, extensions, etc.) that may be deployed on the cloud portal 106 using an application program interface (API) specifically designed for use with that cloud portal 106. That is, the cloud portal 106 may include a plug-in interface that provides one or more interface mechanisms for interfacing with the cloud portal interface component 122 such that resource information may be transferred between the resources 114 and the cloud portal 106 in a relatively seamless manner.

A resource endpoint component generation module 318 generates resource endpoint components 124 to be deployed in the computing node 110' for interfacing the cloud portal interface component 122 configured on the cloud portal 106 with the resources in the computing node 110'. For example, the resource endpoint component generation module 318 may, for each resource 114 included in the manifest records 132 and an interface definition 120 associated with that resource 114, generate a resource endpoint component 124, which may then be deployed on the computing node 110'. The resource endpoint component generation module 318 may obtain the interface definition 120 directly from each resource 114, such as in response to a discovery request, or the resource endpoint component generation module 318 may create the interface definition 120 using information about each resource 114 stored in the manifest records 132. For example, if the manifest records 132 include resource information, such as a make and model information, operating system version and type, and various settings (e.g., registry information) associated with the resource, the resource endpoint component generation module 318 may obtain characteristic information for creating the interface definition 120 by accessing the resource type records 134 that stores characteristic information about each resource 114 according to its make and model type.

In one embodiment in which the cloud portal interface component 122 and resource endpoint component 124 communicates using a RESTful interface, the resource endpoint component generation module 318 may generate one or more web pages for each resource 114 to translate REST messages to/from the cloud portal interface component 122 to another form suitable for interpretation by the element manager 406 that manages the operation of the resource 114 or the resource 114 itself.

It should be appreciated that the modules described herein are provided only as examples, and that the resource interface generator 116 may have different modules, additional modules, or fewer modules than those described herein. For example, one or more modules as described in FIG. 3 may be combined into a single module. As another example, certain modules described herein may be encoded on, and executed on other computing systems, such as on one of the hosts 202 of a converged infrastructure 200 of the cloud computing environment 112.

Figure 4:
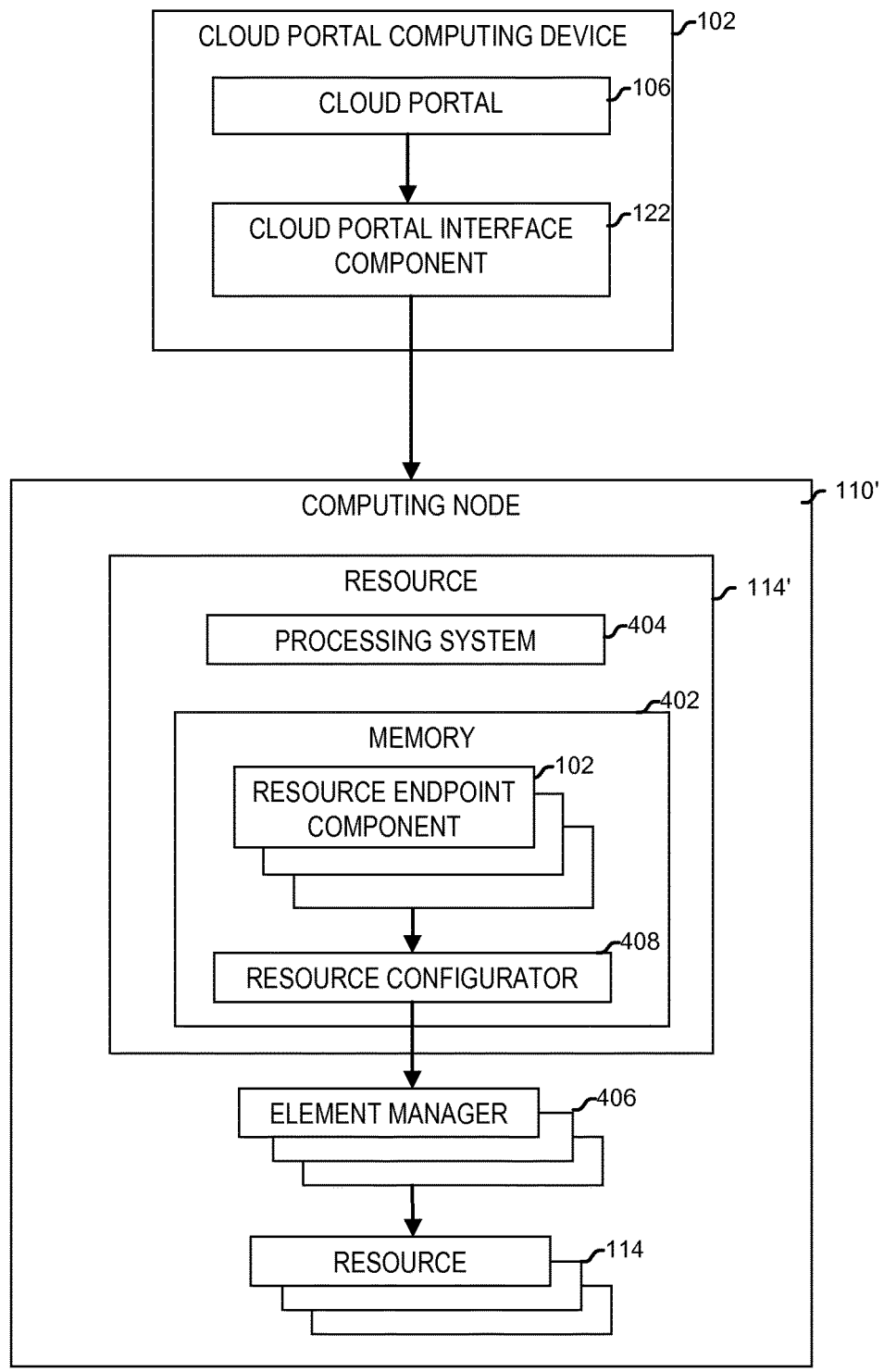
FIG. 4 illustrates an example implementation of a cloud portal interface component and a resource endpoint component on a cloud portal and a computing node, respectively, for managing the operation of one or more resources of the computing node according to one embodiment of the present disclosure.

FIG. 4 illustrates an example implementation of a cloud portal interface component 122 and a resource endpoint component 124 on a cloud portal 106 and a computing node 110', respectively, for managing the operation of one or more resources 114 of the computing node 110' according to one embodiment of the present disclosure. Although the embodiment of the cloud portal interface component 122 and the resource endpoint component 124 as shown is configured to communicate with one another using a REST interface, is should be understood that other embodiments may be implemented with other communication protocols, such as the JSON protocol.

When the cloud portal interface component 122 is generated by the resource interface generator 116, it is installed on the computing device 102 that is used to execute the cloud portal 106. In one embodiment, the cloud portal interface component 122 is included as a modular software component (e.g., a plug-in, an add-on, an extension, etc.) to the cloud portal 106. That is, the cloud portal interface component 122 may be structured in a manner to be integrated with the cloud portal interface component 122. When implemented as a modular software component, the cloud portal 106 may include one or more APIs (e.g., hooks) that are provided to the cloud portal interface component 122 for transmitting information such as status messages, and receiving control messages to be used for controlling certain resources 114.

When the resource endpoint components 124 are generated by the resource interface generator 116, they may be installed on a computing device local to the resources 114 to be managed. In one embodiment, the resource endpoint components 124 are installed on a resource 114' of the computing node 110' and dedicated to execution of the resource endpoint components 124. In other embodiments, the resource endpoint components 124 may be installed on another computing device, such as a stand-alone computing device, such as a personal computer configured external to the computing node 110'. The resource 114' includes a memory 402 for storing the recs 124 and a processing system 404 for executing the stored resource endpoint components 124.

The resource endpoint components 124 may communicate with the resources 114 directly, and/or through one or more element managers 406. If the resource endpoint components 124 communicate with the resources through element managers 406, a resource configurator 408 may be implemented to translate messages to/from the resource endpoint components 124 (e.g., REST invocations) into a format suitable for communicating with the element managers 406. The element managers 406 may include any type that manages the resources 114 of the computing node 110. Examples of element managers 406 that may be implemented with embodiments of the present disclosure include a Cisco Unified Computing System (UCS) manager provided by Cisco Systems, Inc., of San Jose, Calif., and a VMware Virtual Center provided by VMware Corporation, of Palo Alto, Calif.

The resource configurator 408 receives messages from the resource endpoint components 124, determines which element manager 406 is to be used for managing the resource 114, and translates the message to a form suitable for communicating with the selected element manager 406. For example, if the resource configurator 408 receives a request to manipulate a virtual machine configured in the compute sub-system of the computing node 110', it may translate the request to a form compatible with the VMware Virtual Center element manager, and transmits the translated message to that element manager. The same process may be repeated for resources 114 managed by other element managers 406.

If the resource endpoint components 124 include a RESTful interface, one or more resource endpoint components 124 may be generated for each resource 114 to be managed by the cloud portal 106. For example, one resource endpoint component 124 may include a REST-based endpoint used for creating (e.g., provisioning) the resource, another resource endpoint component 124 may include a REST-based endpoint used for removing (e.g., de-provisioning) the resource 114, and another resource endpoint component 124 may include a REST-based endpoint for editing (e.g., modifying) the resource 114. Additionally, each rec 124 may include its own URL address that is hierarch ally based. For example, an endpoint having a URL '/virtual/cluster' may be generated to obtain information about the virtual clusters in the computing node. Additional endpoints may include a '/virtual/cluster/cluster(N)/createCluster' for creating a specified (e.g., 'Nth') cluster, a '/virtual/cluster/cluster(N)/deleteCluster' for deleting the specified cluster, a '/virtual/cluster/cluster(N)/updateCluster' for updating (e.g., editing) the 'Nth' cluster, and so on.

Although FIG. 4 illustrates one example of a configuration of a cloud portal interface component 122 and one or more resource endpoint components 124 that may be implemented for managing resources 114 from a cloud portal 106, other embodiments may be include additional, fewer, or different components than what is shown herein without departing from the spirit and scope of the present disclosure. For example, the resource endpoint components 124 may be configured (e.g., installed) on any suitable computing device in the computing node 110. For another example, the resource endpoint components 124 may be installed in other locations, such as one or more other resources 114 of the computing node 110.

Figure 5:
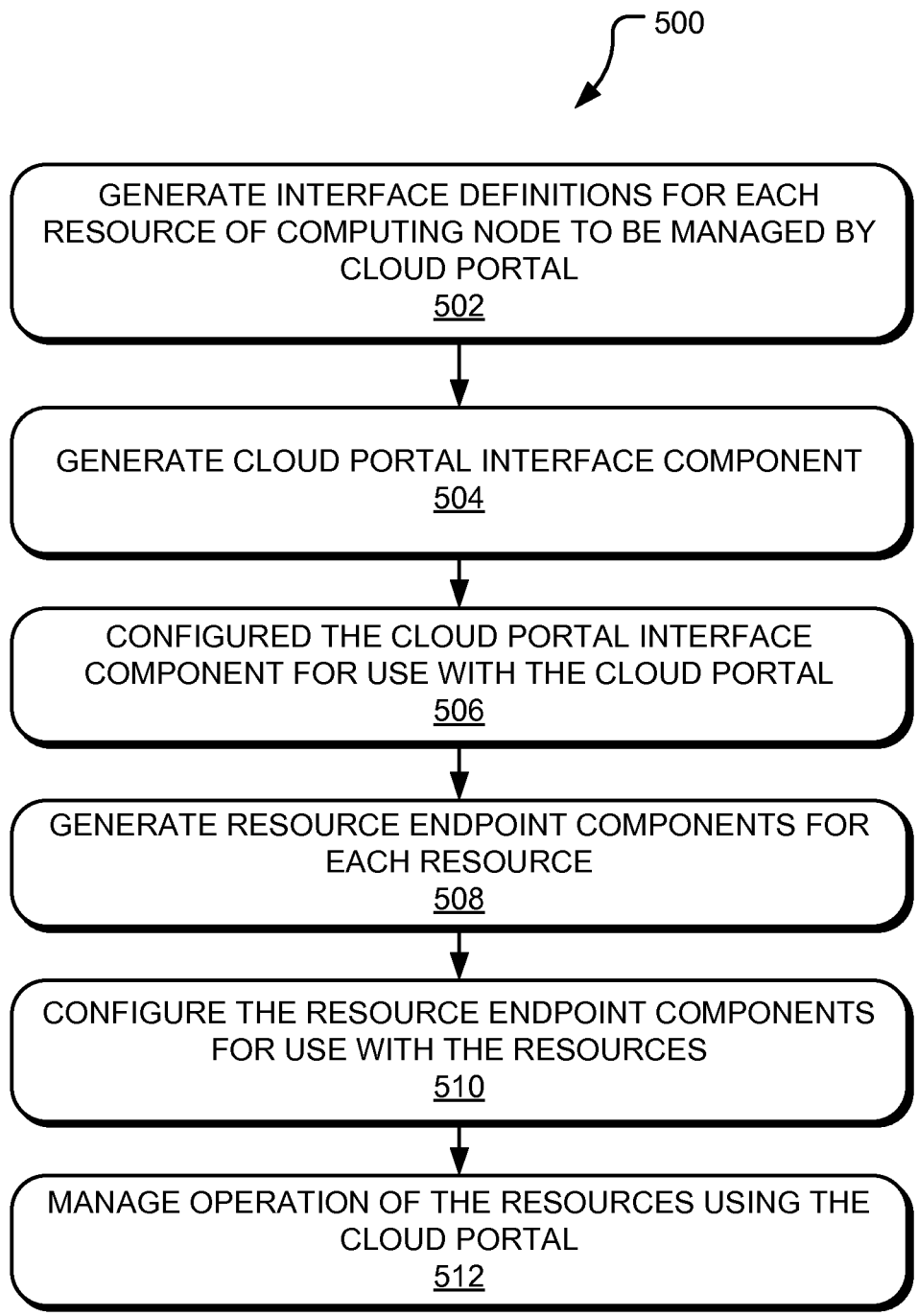
FIG. 5 illustrates an example process that may be performed by the resource interface generator to generate cloud portal interface components and resource endpoint components for managing the resources of a computing node according to one embodiment of the present disclosure.

FIG. 5 illustrates an example process that may be performed by the resource interface generator 116 to generate cloud portal interface components 122 and resource endpoint components 124 for managing the resources 114 of a computing node 110' according to one embodiment of the present disclosure. Initially, a computing node 110' is provided for implementation in a cloud computing environment 112 and controlled by a cloud portal 106 that does not natively support the computing node 110 to be implemented. That is, the cloud portal 106 may not inherently possess the means to control (e.g., manage) the resources 114 of the computing node 110. In a particular embodiment, the computing node 110' comprises a converged infrastructure having multiple sub-systems (e.g., compute sub-system, a network sub-system, and a storage sub-system, etc.) that each functions in a virtualized environment.

In step 502, the resource interface generator 116 generates an interface definition 120 for the resources 114 in the computing node 110 to be controlled by the cloud portal 106. The resources 114 to be controlled by the cloud portal 106 may include some, most, or all of the resources 114 in the computing node 110. In one embodiment, the resource interface generator 116 generates the interface definition 120 for the resources 114 by first performing a discovery process to identify what resources 114 exist in the computing node 110', and then compares the identified resources 114 with one or more resource type files 132 to generate the interface definition 120. In other embodiments, the interface definition 120 may be manually generated and stored in the memory 302 for use by the resource interface generator 116.

In step 504, the resource interface generator 116 generates a cloud portal interface component 122 that when executed, communicates with a cloud portal to translate the one or more configuration operations to a specified protocol. In one embodiment, the specified protocol includes one, such as a REST protocol, or a JSON protocol, that is ideally suited to being transmitted over a packet-based network, such as the Internet.

In step 506, the cloud portal interface component 122 is configured on the cloud portal 106. In one embodiment, the cloud portal interface component 122 comprises a modular software component, such as a plug-in, an add-on, an extension, or the like, that may be deployed on the cloud portal 106 using an application program interface (API) specifically designed for use with that cloud portal 106.

In step 508, the resource interface generator 116 generates a resource endpoint component 124 for each resource 114 to be managed by the cloud portal 106. The resource endpoint component 124 is generated to receive configuration operations from the cloud portal interface component that have been translated to the specified protocol (e.g., REST protocol, JSON protocol, etc.), formats the configuration operation for use by the resource, and transmits the configuration operations to the resource for configuring that resource.

In step 510, the resource interface generator 116 configures the resource endpoint component 124 on the computing node 110. In one embodiment, the resource interface generator 116 allocates one or more resources (e.g., physical hosts or virtual objects) to execute the resource endpoint components 124, and configures (e.g., installs) the resource endpoint components 124 on the allocated resources 114. In another embodiment, a resource configurator 408 is also configured (e.g., installed) on the allocated resources 114. The resource configurator 408 functions to translate messages from the resource endpoint components 124 into a format suitable for use by one or more elements managers 406 to control the operation of the resources 114.

Following implementation of the cloud portal interface component 122 on the cloud portal 106 and the resource endpoint components 124 on the computing node 110, the cloud portal 106, the cloud portal 106 may be used for managing the operation of the resources 114 of the computing node 110 in step 512.

The previous steps may be repeatedly performed for configuring other computing nodes 110 to be managed by the cloud portal 106. Nevertheless, when use of the resource interface generator 116 is no longer needed or desired, the process ends.

Although FIG. 5 describes one example of a process that may be performed by the resource interface generator 116, the features of the disclosed process may be embodied in other specific forms without deviating from the spirit and scope of the present disclosure. For example, the resource interface generator 116 may perform additional, fewer, or different operations than those operations as described in the present example. As another example, the steps of the process described herein may be performed by a system other than the resource interface generator 116, which may be, for example, the cloud portal 106, the resource 114 to be managed, or another set instructions not specifically described herein.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
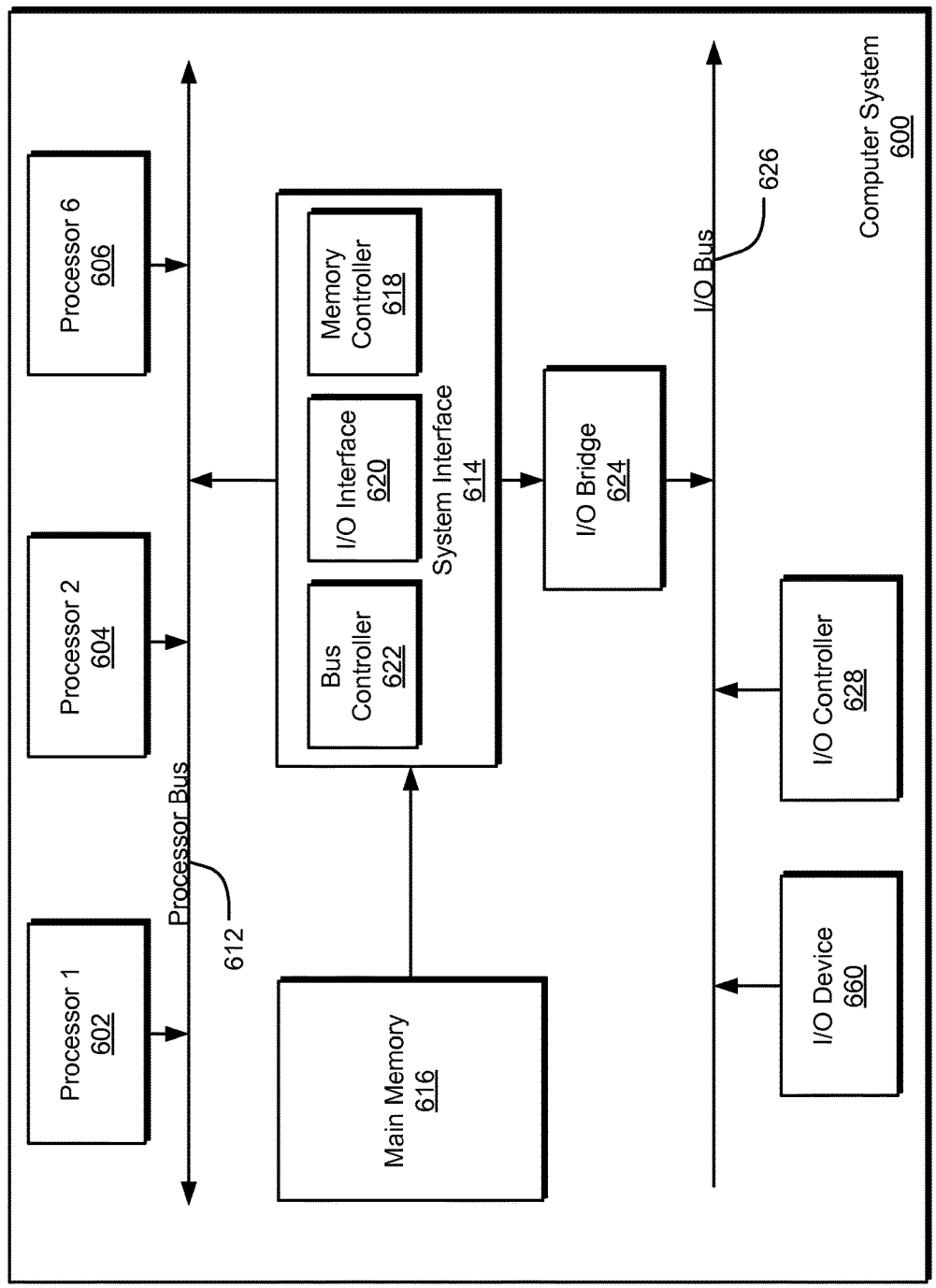
FIG. 6 is a block diagram illustrating an example of a computing device or computer system which may be used in implementing the embodiments of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A cloud management system comprising:
a computing device comprising at least one memory for storing instructions that are executed by at least one processor and in communication with a computing node having a plurality of resources, the instructions are executed to, for at least one of the resources:
  receive an interface definition associated with the at least one resource, the interface definition including information associated with a first configuration operation and a second configuration operation to be performed on the at least one resource, the first configuration operation being different than the second configuration operation;
  generate, using the interface definition, a cloud portal interface component that communicates with a cloud portal to generate the first and the second configuration operations according to a specified protocol; and
  generate, using the interface definition, a first resource endpoint component that receives a first message associated with the first configuration operation from the cloud portal interface component and a second resource endpoint component that receives a second message associated with the second configuration operation from the cloud portal interface component,
  wherein the first resource endpoint component translates the first message to a format suitable for use by the at least one resource, and transmits the translated first message to the at least one resource for configuring the at least one resource according to the first configuration operation, and
  wherein the second resource endpoint component translates the second message to a format suitable for use by the at least one resource, and transmits the translated second message to the at least one resource for configuring the at least one resource according to the second configuration operation.

2. The cloud management system of claim 1, wherein the first and the second resource endpoint components translate the first and the second configuration operations into a format suitable for use by an element manager that controls the at least one resource.

3. The cloud management system of claim 1, wherein the cloud portal does not natively support the computing node.

4. The cloud management system of claim 1, wherein the instructions are executed to create the interface definition for the at least one resource using a discovery process that obtains type information about the at least one resource, and obtains characteristic information associated with the type information that is stored in the at least one memory, wherein the characteristic information is used to generate the interface definition.

5. The cloud management system of claim 1, wherein the computing node comprises a converged infrastructure having multiple sub-systems that each functions in a virtualized environment.

6. The cloud management system of claim 1, wherein the specified protocol comprises at least one of a Representational State Transfer (REST) protocol and a Javascript Object Notation (JSON) protocol.

7. The cloud management system of claim 1, wherein the cloud portal interface component comprises a modular software component including at least one of a plug-in, an add-on, and an extension.

8. The cloud management system of claim 1, wherein the instructions are executed to install the first and the second resource endpoint components on the at least one resource, the first and the second messages comprising a first and a second application program interface (API) message.

9. A method comprising:
receiving, using instructions stored in at least one memory and executed by at least one processor, an interface definition associated with at least one resource, the interface definition including information associated with a first configuration operation and a second configuration operation to be performed on the at least one resource, the first configuration operation being different than the second configuration operation;
generating, using the instructions executed by the processor, a cloud portal interface component that communicates with a cloud portal to generate the first and the second configuration operations according to a specified protocol using the interface definition; and
generating, using the instructions executed by the processor, a first resource endpoint component that receives a first message associated with the first configuration operation from the cloud portal interface component and a second resource endpoint component that receives a second message associated with the second configuration operation from the cloud portal interface component using the interface definition, wherein the first resource endpoint component translates the first message to a format suitable for use by the at least one resource, and transmits the translated first message to the at least one resource for configuring the at least one resource according to the first configuration operation, and wherein the second resource endpoint component translates the second message to a format suitable for use by the at least one resource, and transmits the translated second message to the at least one resource for configuring the at least one resource according to the second configuration operation.

10. The method of claim 9, further comprising translating, by the first and the second resource endpoint components, the first and the second configuration operations into a format suitable for use by an element manager that controls the resource.

11. The method of claim 9, further comprising creating the interface definition for the resource using a discovery process by obtaining type information about the resource, and obtaining characteristic information associated with the type information that is stored in the at least one memory, wherein the characteristic information is used to generate the interface definition.

12. The method of claim 9, wherein the specified protocol comprises at least one of a Representational State Transfer (REST) protocol and a Javascript Object Notation (JSON) protocol.

13. The method of claim 9, wherein the cloud portal interface component comprises a modular software component including at least one of a plug-in, an add-on, and an extension.

14. The method of claim 9, further comprising installing the first and the second resource endpoint components on the resource, the resource endpoint component translating the first and the second messages comprising a first and a second application program interface (API) message.

15. Code implemented in a non-transitory, computer readable medium that when executed by at least one processor, is operable to perform at least the following:

receiving an interface definition associated with at least one resource, the interface definition including information associated with a first configuration operation and a second configuration operation to be performed on the at least one resource, the first configuration operation being different than the second configuration operation;

generating a cloud portal interface component that communicates with a cloud portal to generate the first and the second configuration operations according to a specified protocol using the interface definition; and generating a first resource endpoint component that receives a first message associated with the first configuration operation from the cloud portal interface component and a second resource endpoint component that receives a second message associated with the second configuration operation from the cloud portal interface component using the interface definition, wherein the first resource endpoint component translates the first message to a format suitable for use by the at least one resource, and transmits the translated first message to the at least one resource for configuring the at least one resource according to the first configuration operation, and wherein the second resource endpoint component translates the second message to a format suitable for use by the at least one resource, and transmits the translated second message to the at least one resource for configuring the at least one resource according to the second configuration operation.

16. The code of claim 15, further operable to perform translating the first and the second configuration operations into a format suitable for use by an element manager that controls the resource.

17. The code of claim 15, further operable to perform creating the interface definition for the resource using a discovery process by obtaining type information about the resource, and obtaining characteristic information associated with the type information that is stored in the code, wherein the characteristic information is used to generate the interface definition.

18. The code of claim 15, wherein the specified protocol comprises at least one of a Representational State Transfer (REST) protocol and a Javascript Object Notation (JSON) protocol.

19. The code of claim 15, wherein the cloud portal interface component comprises a modular software component including at least one of a plug-in, an add-on, and an extension.

20. The code of claim 15, further comprising installing the resource endpoint component on a dedicated resource of the at least one resource.

* * * * *